Feb. 20, 1951     R. P. RICHARDSON ET AL     2,542,094
PRIMARY ELECTRIC CELL
Filed Feb. 2, 1948

INVENTORS
Richard Percy Richardson
& Richard Walter Lewis
BY *A. T. O'dell*
ATTORNEY.

Patented Feb. 20, 1951

2,542,094

UNITED STATES PATENT OFFICE 2,542,094

PRIMARY ELECTRIC CELL

Richard Percy Richardson, Erith, England, and Richard Walter Lewis, Hawkhill, Dundee, Scotland, assignors to Burndept Limited, London, England, a British company Application February 2, 1948, Serial No. 5,836
In Great Britain September 10, 1946

Section 1, Public Law 690, August 8, 1946
Patent expires September 10, 1966

6 Claims. (Cl. 136—107)

This invention relates to the construction of primary electric cells, and especially of cells such as those employing the system HgO/KOH/Zn which need a negative electrode of large surface area if a substantial ampere output is to be gotten from a cell of moderate dimensions.

One object of the invention is a primary electric cell having a negative electrode for such cells built of a pile of washers of electro-negative metal spaced apart to afford the electrolyte access to their surfaces and electrically connected by a conductive sheathing enclosing the washers and making good contact with their peripheries.

A further object of the invention is a primary electric cell having a negative electrode built as just described, and having a positive electrode surrounded by a depolarizing mix filling the central opening in the assemblage of washers.

A further particular object of the invention is a primary electric dry cell having positive and negative electrodes and a depolarizer constructed and assembled as just described, the washers of the negative electrode assemblage being spaced apart by washers of bibulous material impregnated with electrolyte.

Other objects of the invention which will appear from the detailed description following include methods of assembling and connecting washers of electro-negative metal to form an electrode, constructions of positive electrode affording a large area of contact with the depolarizer commensurate with the large area of negative electrode characteristic of the construction above set out, and other features of construction of electric dry cells, and especially of cells employing a mercuric oxide depolarizer, a caustic potash electrolyte, a positive electrode of carbon or iron and a negative electrode of zinc, which contribute to make it possible to take full advantage of the construction of negative electrode and other features first above set forth.

The invention is further described with reference to the accompanying drawings in which Figure 1 shows by way of example in longitudinal section, a construction of dry cell embodying the invention;

As already indicated the assemblage of washers which is to constitute the negative electrode must admit of electrolyte reaching the whole of the surface of the washers, and all parts of it must be in conductive connection.

Figure 2:
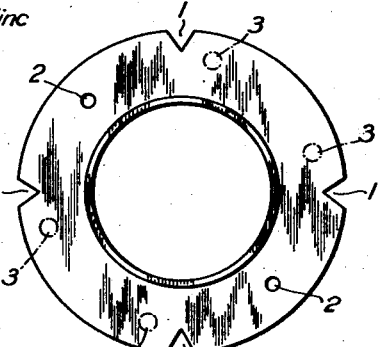

The construction of zinc washers shown in Figure 2 provides for passage of electrolyte lengthwise of the cell by notches 1 in its periphery. In order that these may be aligned, the washer may also have in it one or more perforations 2 to receive assembly pins or wires. To provide passage for the electrolyte transversely between the washers, the washers may have minute corrugations or bosses 3 pressed in them. A large number of washers so formed are assembled upon a mandrel which fills the central opening of the washers and two assembly pins parallel with the mandrel which pass through the perforations 2. The convex surface of a boss 3 being of larger radius than the concave surface, the bosses, though they register, do not fit closely one within the other, so the flat surfaces of the washers do not come together.

Contact may be established between all the washers of a pile so assembled by tightly wrapping the pile in a sheet of zinc, and soldering the overlapped or abutting edges of the sheet together. This wrapping, as well as connecting the washers electrically, forms the cylindrical wall of a cell container which may be completed at the bottom end by a disc of zinc separated from the bottom of the pile by a washer or waxed cardboard, and held in place by spinning over it the edge of the zinc wrapping. The cell may be completed in respect of positive electrode, depolarizer and sealing as described below.

Figure 4:
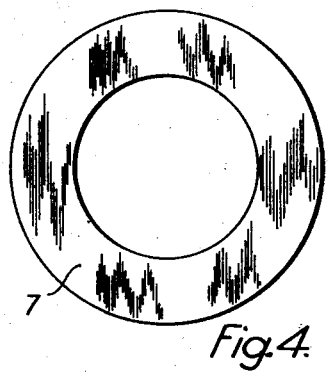
Figure 4 shows a washer of bibulous material to be interleaved between the metal washers forming the negative electrode of a dry cell.

In the case of a dry cell, to the construction of which the invention is specially adapted, washers of bibulous paper, such as shown in Figure 4, are interposed between the zinc washers; it is then unnecessary to provide corrugations or dimples 3 to separate the zinc washers.

Figure 3:
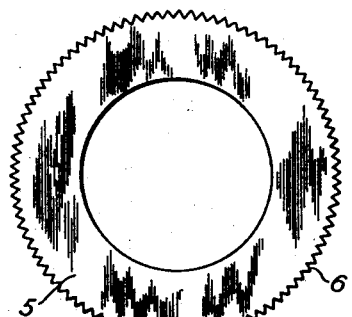
Figures 2 and 3 show examples of the form of washer of which negative electrodes may be built up.
Figure 1:
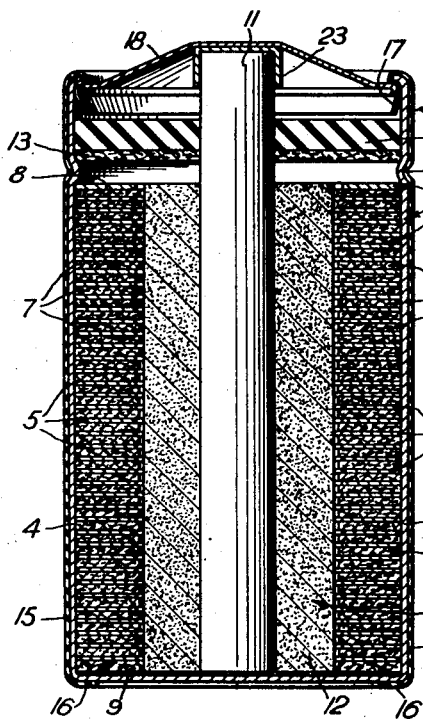

A preferred method of uniting the zinc washers electrically is to assemble them is a pre-formed zinc container such as had been commonly employed hitherto in dry cells of the Leclanche type. The cell shown in Figure 1 is thus constructed, the zinc container being shown at 4. To ensure good contact between the washers and the container, the former may be made with sharp pointed projections in their periphery, so that not only may the washers be a tight fit in the container, but the pointed projections may to some extent embed themselves in the metal of the container. Figure 3 shows a construction of zinc washer 5 with a minutely serrated edge 6 which is suitable for this purpose. A pile of these washers is assembled as above described upon a mandrel with washers of bibulous paper 7 interleaved between them, the latter being of slightly less internal and external diameter; a thicker zinc washer 8 is put on top of them and the assembled pile is forced into a container 4 of internal diameter slightly less than the diameter of the serrated washers, in the bottom of which is placed a disc 9 of chip-board. The result of this is a bending or coning of the teeth of the serrations as the washers enter the container, and subsequent flattening of the teeth and penetrations of their points into the container when the pile as a whole is compressed.

While the pile of washers is thus held compressed in the container, the wall of the container is pressed inward immediately above the pile as seen at 10, either in a continuous groove or in a ring of dimples, to retain the washers in their compressed condition. The pile is then taken from the press, and the mandrel is removed.

A dolly consisting of a positive electrode 11 of rod form, or of any such form as those described below, surrounded by a depolarizer mass 12, is then thrust into the central opening in the pile of washers, which it fills. The positive electrode may be made of iron or carbon; in the latter case it is preferably fitted with a metal cap 23. The dolly may be made by methods generally similar to those used in the making of dollies for Leclanche cells; the active material surrounding the positive electrode may be a mixture of mercuric oxide with carbon wrapped in paper which will withstand the caustic alkali electrolyte. The cell is then filled with electrolyte, a solution of caustic potash, which finds its way between the serrations 6, or through the notches 1, at the periphery of the washers 5, and soaks into the paper washers 7, and also impregnates the whole of the dolly 12.

A washer of chip-board 13, is then threaded over the projecting end of the positive electrode and rests upon the inward projection 10, and upon this is poured a bituminous sealing compound 14.

When the cell is in use the electrolyte action causes combination and solution of the zinc, with the consequence that at the end of the life of the cell the container 4 may be corroded through allowing electrolyte to escape. As the cell is commonly assembled with others in a battery, or forms part of an apparatus including metal parts, or is enclosed in a metal casing, the escape of electrolyte may cause damage to parts adjacent to the cell.

To prevent this the cell is encased in a sleeve 15 of polyvinyl chloride or like plastic, which is stretched over it and when released folds over the bottom of the container as seen at 16, and also over the lip of the container as at 17.

Besides preventing leakage of electrolyte and damage to surrounding parts this insulating sheathing makes possible the closure of the mouth of the cell by a coned cup 18 of metal, over the edge of which the insulation-sheathed lip of the container is spun, so retaining the cap in position and in firm contact with the positive electrode 11, and also clamping the end of the polyvinyl chloride sleeve which insulates the cap from the negative electrode.

Figure 5:
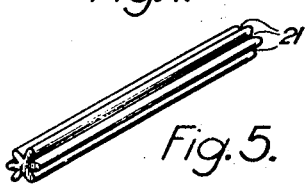
Figures 5 and 6 show examples of construction of positive electrode.
Figure 6:
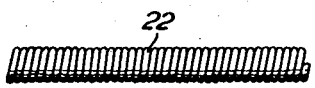

When the active surface area of the negative electrode has been made very large by construction of the electrode from a pile of washers as above described, it may be that the surface area of the positive electrode may become a factor limiting the output of the cell. It is therefore desirable to make the positive electrode of larger surface area than a simple cylindrical rod. A rod of square or triangular section will have a somewhat greater area than a cylinder of the same cross-sectional area. The surface area of a cylindrical rod may be increased by forming a number of circumferential grooves in it, or forming it with longitudinal grooves 21 as seen in Figure 5, after the fashion of pinion wire. Or, if the electrode is of metal, instead of being a rod it may be constructed of a closed helix of wire 22, as seen in Figure 6, which can be screwed into the mix of the dolly.

We claim:
1. A primary electric cell comprising a close-packed pile of washers of electro-negative metal alternating with washers of bibulous material, a sheathing of the same electro-negative metal enclosing them and connecting the metal washers conductively, a positive electrode passing through the middle of said washers and spaced therefrom, and a depolarizing mix filling the space between said positive electrode and the inner edges of the washers.

2. A primary electric cell comprising a close-packed pile of zinc washers alternating with washers of bibulous material and metallically connected by an enclosing wrapping of zinc, a positive electrode passing through the middle of said washers and spaced therefrom, and a depolarizing mix including mercuric oxide filling the space between the positive electrode and the inner edges of the zinc washers.

3. A primary electric dry cell comprising a cylindrical container of electro-negative metal closed at one end, a pile of washers of the same electro-negative metal interleaved with washers of bibulous paper forced into said container, the metal washers fitting said container closely, and a dolly made up of a positive electrode and a surrounding depolarizer mix filling the central space within said washers.

4. A primary electric dry cell according to claim 3, said container presenting inward projections in its cylindrical wall immediately above the said pile of washers retaining said pile under pressure.

5. A primary electric dry cell comprising a cylindrical zinc container closed at one end, a pile of zinc washers interleaved with washers of bibulous paper within said container, said zinc washers fitting the container tightly, a positive electrode of fluted form passing through the middle of said washers and spaced therefrom, and a depolarizing mix filling the space between said positive electrode and the inner edges of said washers.

6. A primary electric cell comprising a preformed cylindrical container of electro-negative metal closed at one end, a pile of washers of the same electro-negative metal with serrated edges which is a force fit within said container, washers of bibulous paper interleaved with said washers of electro-negative metal, and a dolly made up of a positive electrode and a surrounding depolarizer mix filling the central space within said washers.

RICHARD PERCY RICHARDSON.
RICHARD WALTER LEWIS.

REFERENCES CITED

The following references are of record in the file of this patent:

UNITED STATES PATENTS

| Number | Name | Date |
|---|---|---|
| 385,254 | Doyle | June 26, 1888 |
| 554,043 | Williams et al. | Feb. 4, 1896 |
| 870,985 | Mollenbruck et al. | Nov. 12, 1907 |
| 1,157,531 | Harper | Oct. 19, 1915 |
| 1,552,396 | Deibel | Sept. 1, 1925 |
| 1,582,687 | Ramsay | Apr. 27, 1926 |
| 1,592,361 | Hendry | July 13, 1926 |
| 2,402,784 | Smithback | June 25, 1946 |
| 2,422,045 | Ruben | June 10, 1947 |